(12) United States Patent
Houck

(10) Patent No.: X7574
(45) Date of Patent: May 9, 1833

(54) PANACEA

(76) Inventor: Jacob Houck

Jacob Houck

The Schedule referred to in these Letters Patent, and making part of the same, containing a description in the words of the said Jacob Houck himself of his improvement in Medicine, called "Houcks Panacea".

---

Be it Known that I, Jacob Houck of Baltimore in the County of Baltimore, & State of Maryland, have made a discovery in Medicine called "Houcks Panacea" the mode of compounding which is described as follows.

( Take 25 gallons of Rye whiskey: to which add 25lb of Gum Guac. 150lb of sugar: 1lb of oil of Juniper, & 5 oz: of oil of Lemon: incorporate these well together: then bottle the mixture & it will be fit for use. = )

Directions for using the Panacea.

Turn the bottle two or three times. _ then for an Adult take one table spoon full of the mixture before breakfast; & two table spoons full at 11 oClock & two table spoons full on going to bed. For children the doses may be regulated according to their ages ... The doses may be increased or diminished agreeably to the feelings & constitution. In a few days after taking the medicine, you will be able to discover how it will act on the disease; & you can judge whether you should increase or diminish the doses. Should benefit arise from taking one or two bottles of the medecine, it should be continued until cured.

When the case is obstinate, it requires from three to five bottles to effect a cure: & after having discontinued the medicine for about two weeks, & every symptom of the disease has disappeared, then one or two bottles more ought to be given; especially where the cases have been obstinate & of long standing that a certainty of a perfect cure may be established & the cause of the disease completely eradicated.
This medicine is an effectual cure for the following
diseases, Dyspepsia, Loss of appetite, Indigestion, Inflamation
of the stomach, Heart burn, Diarrhea, Dysentary or Flux, Cholera
morbus, consumption, Influenza, Colds, Coughs, Inflamation
of the Chest, Palsy, Gout, Rheumatism, Inflamatory sore throat
or Quinsy, Whooping cough, Thrush or sore mouth, Putrid sore
throat, Croup, Inflamation of the heart, Dropsy, Rickets, Dis-
eases of the liver, Jaundice, obstructed & painful menstruation,
Difficulty of making urine, Gleet, Hysterics, Nervous & Scrofu-
lous Affections of the members, & Ligaments, Mercurial &
Venereal Diseases, Ulcers, Sores, Affections of the skin & all
diseases arising from impure blood &c.

Witnesses
William P. Elliot
Henry Neale

Jacob Houck

Exd. [illegible]

(418 words)